United States Patent [19]
Bishop

[11] 3,739,683

[45] June 19, 1973

[54] EXPANSION FASTENING DEVICE
[76] Inventor: Jerald W. Bishop, 1506 Highway 56, Dodge City, Kans. 67801
[22] Filed: Jan. 27, 1972
[21] Appl. No.: 221,302

[52] U.S. Cl. ................................. 85/70
[51] Int. Cl. .............................. F16b 13/06
[58] Field of Search ............ 85/70, 71, 1 JP, 85/80

[56] References Cited
UNITED STATES PATENTS
| | | | |
|---|---|---|---|
| 2,236,079 | 3/1941 | Wipper | 85/71 |
| 2,753,610 | 7/1956 | Miller | 85/70 X |
| 3,017,800 | 1/1962 | Cohen | 85/70 |

FOREIGN PATENTS OR APPLICATIONS
704,510  2/1954  Great Britain ............. 85/70

Primary Examiner—Ramon S. Britts
Attorney—John A. Hamilton

[57] ABSTRACT

An expansion fastening device for fastening objects to a sheet metal wall consisting of a screw adapted to be inserted through a hole formed in the wall, a cover plate larger than the hole and disposed at one side of the wall, the screw being rotatably mounted in the cover plate, a tubular resilient metal cage normally proportioned to be inserted axially through the hole, but being transversely expandable to a size too large to pass through the hole, a rubber block confined in the cage, and a draw bar engaging the surface of said block opposite said cover plate, the screw extending through the block and being threaded in the draw bar.

4 Claims, 3 Drawing Figures

Patented June 19, 1973
3,739,683
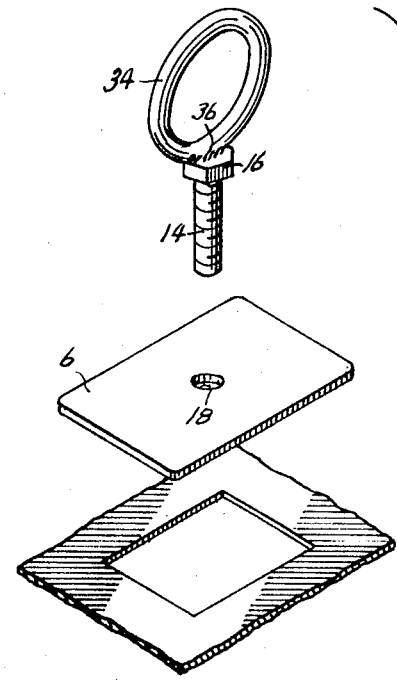
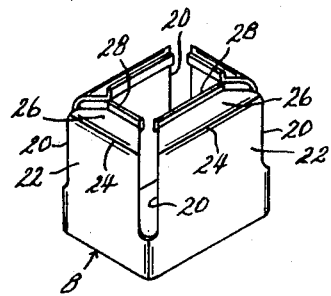
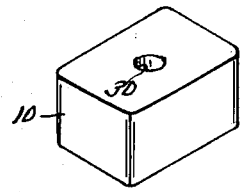
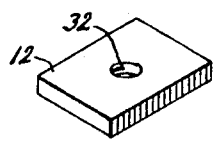
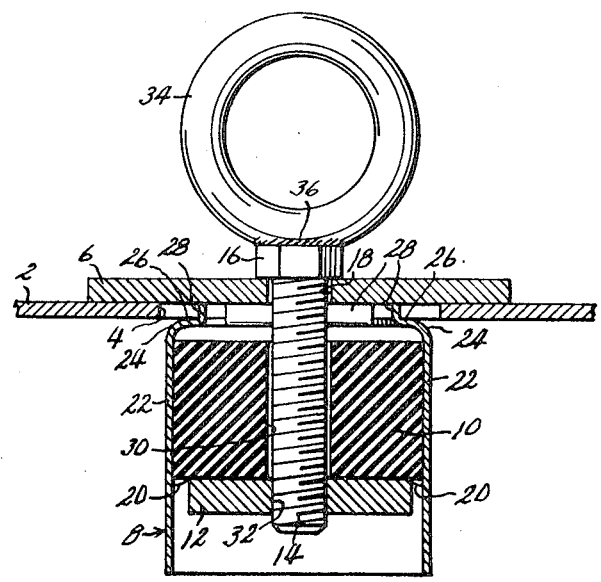
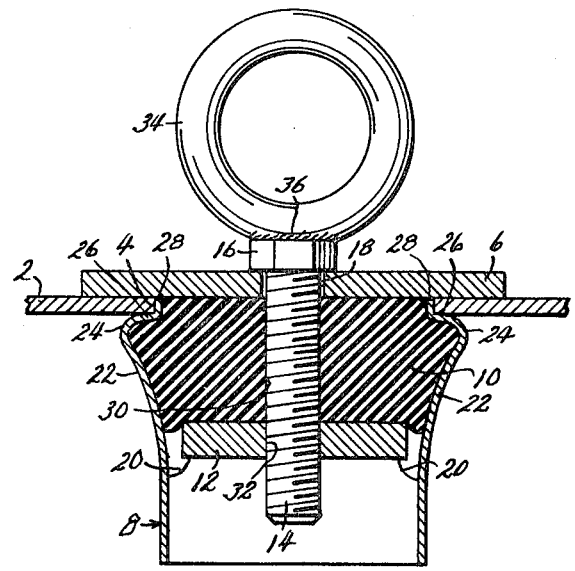
Fig. 1
Fig. 2
Fig. 3

EXPANSION FASTENING DEVICE

This invention relates to new and useful improvements in fastening devices, and has particular reference to fasteners of the expansion bolt type.

A primary object of the present invention is the provision of an expansion fastener wherein the expandable element is expanded by the resilient deformation of a confined rubber block to which a compressive force is applied by a screw mechanism.

Another object is the provision of a fastener of the character described which depends on the rigidity of the rubber block for its holding power, said rigidity being supplied by confining said block substantially completely in a metal cage, taking advantage of the fact that rubber, though easily deformed, is substantially incompressible when confined.

A further object is the provision of a fastener of the character described having novel means insuring proper angular orientation of the fastener relative to the hole in the sheet metal wall to which it is being secured, and for limiting the expansion thereof to avoid permanent deformation thereof.

Other objects are simplicity and economy of construction, efficiency and dependability of operation, and ease and convenience of both application and removal.

With these objects in view, as well as other objects which will appear in the course of the specification, reference will be had to the accompanying drawing, wherein:

FIG. 1 is an exploded perspective view of the elements forming an expansion fastener embodying the present invention, FIG. 2 is an enlarged sectional view of the assembled fastener shown inserted into a hole in a sheet metal wall, but prior to tightening and securing thereof, and FIG. 3 is a view similar to FIG. 2, but showing the fastener fully tightened.

Like reference numerals apply to similar parts throughout the several views, and the numeral 2 applies to a sheet metal wall, shown fragmentarily, having a hole 4 formed therethrough into which the fastener contemplated by the present invention is to be secured. As shown, said hole is rectangular, though it could be of other configurations as well.

In accordance with the present invention, the fastener consists of a cover plate 6, a cage 8, a rubber block 10, and a draw bar 12, and a screw 14. Screw 14 is provided with an enlarged head 16 which may be hexagonal for the application of a wrench thereto. Cover plate 6 is adapted to overlie hole 4 of wall 2, being of greater dimensions than said hole, and is provided with a central hole 18 through which screw 14 may be inserted inwardly until its head 16 engages said cover plate. Said screw is freely rotatable relative to the cover plate.

Cage 8 is generally tubular and formed of resilient steel or other suitable material. It is adapted to be disposed coaxially with the screw at the side of wall 2 opposite from cover plate 6. As shown, it is of rectangular cross-sectional contour, corresponding to the proportions of hole 4, but normally of slightly smaller dimensions than said hole so as to pass freely therethrough. The end portion of the cage tube adjacent cover plate 6 has a plurality of slots 20 formed longitudinally therein, said slots extending through the end of the cage adjacent cover plate 6, but terminating short of its opposite end. As shown, there is a slot 20 at each of the four corners of the rectangular cross-sectional contour of the cage. Therefore, at the slotted end of the cage, each side wall thereof constitutes a leaf spring 22, which may be resiliently deflected outwardly. The upper edge portion of each side wall is curved inwardly, the curvature being indicated at 24, to form a lip 26 the plane of which is normally disposed at right angles to the axis of the cage. The inner edge portion of each lip 26 is bent sharply upwardly to form an ear 28 the plane of which is parallel to the cage axis. Ears 28 rise above lips 26 by a distance equal to or slightly less than, but preferably no greater than, the thickness of sheet metal wall 2. The upper edges of ears 28 define a plane at right angles to the cage axis.

Block 10 is formed of rubber or other resilient material of a medium density, and is generally rectilinear in form. It has a hole 30 formed centrally therethrough, through which screw 14 extends. Its cross-sectional contour, in a plane normal to hole 30, is such as to fit snugly within cage 8, and its thickness, longitudinally of hole 30, is less than the axial length of cage 8. Draw bar 12 is simply a flat rectangular steel plate, of a size to be inserted freely into the lower end of cage 8, beneath block 10, and having a threaded hole 32 formed centrally therethrough for threadably receiving screw 14. Screw 14 may also serve as the carrier or mounting member for an object to be secured to wall 2 by means of the fastener. As shown, said object consists of a circular eye 34 welded at 36 to the head 16 of the screw. One intended usage of the device is to mount any number of such eyes in the stake holes of a truck bed, said eyes then to serve as anchoring points for ropes or cables used to tie down or otherwise secure loads in the truck bed, but this is obviously only an example of many possible usages, and the eye itself is only one of many objects which could be secured by the fastener.

The fastener is assembled as shown in FIG. 2, block 10 being inserted in the lower end of cage 8 with draw bar 12 therebeneath, and screw 14 inserted through hole 18 of cover plate 6, then into the upper end of cage 8 and through hole 30 of rubber block 10, and finally threaded into hole 32 of draw bar 12. At this time, the screw is preferably tightened only enough to draw the upper edges of cage ears 28 snugly against cover plate 6, but not so tightly as to deform block 10 and deflect leaf spring portions 22 of the cage outwardly. The device then has the configuration shown in FIG. 2, and cage 8 may be freely inserted inwardly through hole 4 of wall 2 until cover plate 6 engages said wall, as shown. Screw 14 is then tightened to force draw bar 12 upwardly against rubber block 10, and said block against the lower surface of cover plate 6. Then, further turning of the screw forces said rubber block to flow or deform radially outwardly from the screw to flex the leaf spring walls 22 of the cage outwardly, since the block is confined in a "box" formed by draw bar 12, cover plate 6 and the side walls 22 of the cage, and the leaf spring walls are the only yieldable walls of this "box". During this movement, the external surfaces of the curved portions 24 of the cage engage the edges of wall 2 bounding hole 4 and act as cams forcing the cage downwardly, if such downward movement is necessary, to permit lips 26 to move into engagement with the inner surface of wall 2, as shown in FIG. 3. This movement may continue until ears 28 engage the edges of hole 4, whereupon it is arrested. The fastener is then fully engaged. It may be released by reversing the rotation of screw 14.

The engagement of lips 26 with the inner surface of wall 2 locks cage 8 against withdrawal through hole 4, and the engagement of block 8 in the inner contours of curvatures 24 assists in preventing said block from being withdrawn outwardly from the cage. It might at first appear that said block might be withdrawn relatively easily from the cage, since cover plate 6 is free to move outwardly from wall 2 if screw 14 is moved in that direction by forces exerted on eye 34. Such, however, is not the case. Any such movement of the block necessarily would involve a compression or reduction of volume of the block, in order to pass through the end of the cage which is restricted in area by lips 26, and such reduction of volume cannot occur so long as the block is substantially rigidly confined. Rubber, when so confined, is substantially incompressible. Ears 28, by their engagement with the edges of hole 4, arrest the expansion of the cage to provide the substantially rigid confinement of the block. Corner slots 20 of the cage are sufficiently restricted in area that they do not permit appreciable outward flow of the rubber therethrough. The device would possess quite substantial holding power, sufficient for many purposes even without ears 28 to limit the cage expansion and hence to confine the block in a substantially rigid "box" but its holding power is nevertheless substantially enhanced by the presence of said ears.

Ears 28 will be seen to possesss several valuable functional effects. First, during the initial tightening of screw 14, they space lips 26 sufficiently below cover plate 6 to insure that said lips can properly engage the inner surface of wall 2, and that the cam action of curves 24 can occur, rather than permitting the upper edges of cage side walls 22 simply to abut the edge surfaces of hole 4. This permits the use of the fastener in sheet metal walls of virtually any thickness. Second, at least when wall hole 4 and the cage 8 are rectangular as shown, ears 28 prevent the cage from rotating with the screw when the latter is turned. Such rotation would of course prevent the fastener from being tightened. Other means could be used to prevent rotation of the cage, such as a connection between the cage and cover plate 6, said connection being slidable in a direction radial to screw 14, but the ears provide a far simpler solution to the problem. Third, the engagement of ears 28 with the edges of wall hole 4 not only limits the expansion of the cage to provide substantially rigid confinement of rubber block 10, as already discussed, but also prevents overtightening of the screw, which could cause permanent deformation of both the cage and the block, and render the fastener unfit for repeated usages. Alternatively, in the absence of ears 28, the cage expansion could be limited by regulating the turning force applied to screw 14, as by means of a torque wrench, but this is a relatively tedious procedure requiring special equipment not always available.

While I have shown and described a specific embodiment of my invention, it will be readily apparent that many minor changes of structure and operation could be made without departing from the spirit of the invention.

What I claim as new and desire to protect by Letters Patent is:

1. An expansion fastener operable to be affixed in a sheet metal wall having a hole formed therethrough, said fastener comprising:
   a. a rigid cover plate larger than the hole of said wall and adapted to overlie said hole externally of said wall,
   b. a screw rotatably mounted in said cover plate and adapted to extend inwardly through said wall hole to the interior side of said wall,
   c. a hollow cage of resilient metal surrounding said screw inwardly of said cover plate, said cage having cross-sectional dimensions, in a plane normal to said screw, sufficiently small to permit free passage thereof through said wall hole, but being resiliently ex-pansible, radially of said screw, to larger dimensions preventing its passage through said wall hole, said cage being of substantially tubular, open-ended form and disposed generally coaxially with said screw, the end portion thereof closest to said cover plate being formed with longitudinal slots which open at said end whereby the portions of its side walls intermediate said slots may be flexed radially outwardly from said screw, the end portion of each of said side wall sections closest to said cover plate being angled inwardly to form a lip generally normal to said screw with the free extremity of each of said wall sections extending from said lip substantially parallel to said screw, said lips being operable to engage the inner surface of said sheet metal wall adjacent the hole thereof when the cage is expanded,
   d. a rubber block confined in said cage, and
   e. a draw bar disposed in said cage at the surface of said rubber block opposite from said cover plate, said screw being threaded in said draw bar.

2. An expansion fastener as recited in claim 1 wherein each of said cage side wall sections is connected to its associated lip by an externally convex curved portion of said side wall, said curved portions serving as cams engaging said sheet metal wall at the edges of the hole thereof to direct the engagement of said lips with the inner surface of said sheet metal wall.

3. An expansion fastener as recited in claim 1 with the addition of members carried by said cage and projecting from said lips toward said cover plate, and operable by their engagement with said cover plate to space said lips apart from said cover plate to permit the engagement of said lips with the inner surface of said sheet metal wall.

4. An expansion fastener as recited in claim 1 wherein the extreme inner edge portion of each of said lips is angled relatively to the main portion of said lip toward said coverplate to form an ear, the extension of said ear toward said cover plate being no greater than the thickness of said sheet metal wall, said ears being operable by their engagement with said cover plate to space said lips apart from said cover plate, and by their engagement with said sheet metal wall at the edges of the hole thereof, as said cage is expanded, to limit the expansion of said cage.

* * * * *